E. ALLEN.
Revolver.
No. 1,268.
Reissued Feb. 4, 1862.
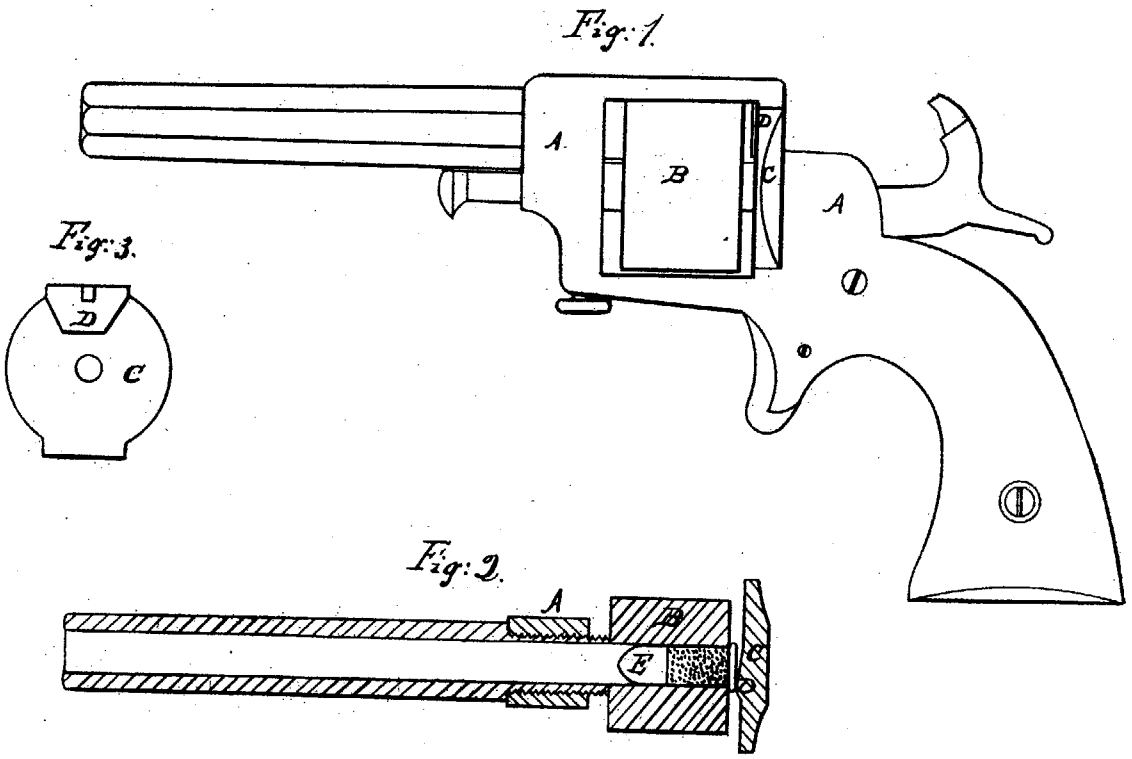
Witnesses
Wm. H. Wilson
A. de Lacy
Inventor
Ethan Allen.
N. PETERS, PHOTO-LITHOGRAPHER, WASHINGTON, D. C.

UNITED STATES PATENT OFFICE.

ETHAN ALLEN, OF WORCESTER, MASSACHUSETTS.

IMPROVEMENT IN REVOLVING FIRE-ARMS.

Specification forming part of Letters Patent No. 28,951, dated July 3, 1860; Reissue No. 1,268, dated February 4, 1862.

*To all whom it may concern:*

Be it known that I, ETHAN ALLEN, of Worcester, in the State of Massachusetts, have invented a new and useful Improvement in Repeating Fire-Arms; and I do hereby declare that the following is a full, clear, and exact description thereof, reference being had to the accompanying drawings, making part of this specification, in which—

Figure 1 is a side elevation of a pistol on my improved plan; Fig. 2, a longitudinal section, and Fig. 3 a face view of the recoil-plate.

The same letters indicate like parts in all the figures.

My invention relates to that class of fire-arms in which the charges are contained in metallic cartridges inserted into the rear end of a series of chambers extending entirely through a rotating cylinder placed between the rear end of the barrel and a recoil-plate, the said chambers, by the rotation of the cylinder, being brought successively in line with the barrel for firing the charge.

The metallic cartridges used in this class of arms are formed with a projecting rim at the rear end, which rim rests against the rear end of the chamber and between it and the recoil-plate behind. It is important in this class of arms that at the time of the discharge the cartridge should be held in place in its chamber. To insure this the recoil-plate should be in contact, or nearly so, with the rear end of the cartridge at the time of the discharge, to effectually resist the recoil, and thereby retain the cartridge in its chamber. The friction due to the binding of the rear end of the cartridges against the face of the recoil-plate impedes the cylinder and renders it too hard to turn.

The object of my invention is to overcome the difficulty above pointed out; and to this end the nature of my invention consists in forming the recoil-plate so that its surface shall be nearer to the rear end of the cylinder opposite the chamber which is in line with the barrel than elsewhere, so as properly to confine the cartridge during the discharge without binding on the cartridges which are not in line with the barrel, thereby greatly reducing the friction and the amount of power required to turn the cylinder; and with the view to reduce such binding to the smallest practical extent, my invention also consists in making the projection on the recoil-plate, which, as before stated, is in line with the barrel, in the form of an inclined plane, by reason of which form the cylinder will be relieved of the binding due to such projection, so soon as by the rotation of the cylinder the rear end of the cartridge passes by the summit of the projection.

A is the frame of the pistol. B is the cylinder. C is the recoil-plate. D is a projection on the recoil-plate C in the form of an inclined plane.

E is a metallic cartridge. The metallic cartridges E are inserted in the rear end of the chambers, as represented, and as each is brought into position to be discharged it comes in contact at the rear end with the incline D, which holds it in place. The cylinder B revolves from the base of the inclined plane D, which frees the cylinder from the pressure caused by the setting back of the cartridge in being discharged and allows it to turn freely, which is not the case when the recoil-plate is of a level or even surface.

Other parts of the arm, being similar to those in common use, need not be described.

What I claim as my invention, and desire to secure by Letters Patent, is—

1. The combination of a revolving cylinder having its chambers extending entirely through the block, with an unbroken recoil-shield having a projection on its face, as described, and for the purpose set forth.

2. In the said combination, as described, the making of the said projection on the recoil-plate in the form of an inclined plane, substantially as and for the purpose specified.

ETHAN ALLEN.

Witnesses:

WM. H. BISHOP,

A. D. LACY.